(12) United States Patent
Boerakker

(10) Patent No.: US 10,882,986 B2
(45) Date of Patent: Jan. 5, 2021

(54) PIPE PRODUCED WITH A POLYMER COMPOSITION COMPRISING A POLYOLEFIN

(71) Applicant: SABIC GLOBAL TECHNOLOGIES B.V., Bergen op Zoom (NL)

(72) Inventor: Mark Johannes Boerakker, Eindhoven (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 25 days.

(21) Appl. No.: 15/764,944

(22) PCT Filed: Sep. 27, 2016

(86) PCT No.: PCT/EP2016/072928
§ 371 (c)(1),
(2) Date: Mar. 30, 2018

(87) PCT Pub. No.: WO2017/055253
PCT Pub. Date: Apr. 6, 2017

(65) Prior Publication Data
US 2018/0258265 A1    Sep. 13, 2018

(30) Foreign Application Priority Data

Oct. 1, 2015 (EP) .................................. 15187971

(51) Int. Cl.
| | | |
|---|---|---|
| *C08L 23/06* | (2006.01) | |
| *F16L 9/12* | (2006.01) | |
| *C08K 3/34* | (2006.01) | |
| *C08K 5/13* | (2006.01) | |
| *C08K 5/098* | (2006.01) | |
| *C08K 5/524* | (2006.01) | |
| *C08K 3/04* | (2006.01) | |
| *C08K 5/134* | (2006.01) | |
| *C08L 53/02* | (2006.01) | |

(52) U.S. Cl.
CPC ............... *C08L 23/06* (2013.01); *C08K 3/04* (2013.01); *C08K 3/34* (2013.01); *C08K 5/098* (2013.01); *C08K 5/13* (2013.01); *C08K 5/1345* (2013.01); *C08K 5/524* (2013.01); *C08L 53/02* (2013.01); *F16L 9/12* (2013.01); *C08L 2203/18* (2013.01); *C08L 2205/025* (2013.01); *C08L 2207/062* (2013.01)

(58) Field of Classification Search
CPC . C08K 3/04; C08K 3/34; C08K 5/098; C08K 5/13; C08K 5/1345; C08K 5/524; C08L 23/06; C08L 53/02; C08L 2207/062; C08L 2203/18; C08L 2205/025; F16L 9/12
USPC .......................................................... 524/153
See application file for complete search history.

(56) References Cited

U.S. PATENT DOCUMENTS

| | | |
|---|---|---|
| 3,299,174 A | 6/1967 | Kuhre et al. |
| 6,756,446 B2 * | 6/2004 | Ding .................. C08L 23/10 524/423 |
| 2012/0070597 A1 | 3/2012 | Siddhamalli et al. |
| 2012/0118390 A1 | 5/2012 | Piel et al. |
| 2014/0163145 A1 * | 6/2014 | Anker ................ C08L 23/0815 524/110 |
| 2018/0223075 A1 * | 8/2018 | Boerakker ............ C08K 5/005 |
| 2018/0244902 A1 * | 8/2018 | Vachon .................. C08K 3/22 |
| 2019/0071561 A1 * | 3/2019 | Boerakker ............... F16L 9/12 |

FOREIGN PATENT DOCUMENTS

| | | | |
|---|---|---|---|
| CA | 1162730 A | 2/1984 | |
| EP | 2484723 A1 | 8/2012 | |
| EP | 1879954 B1 | 7/2013 | |
| EP | 2454076 B1 | 8/2013 | |
| WO | 09010211 A1 | 9/1990 | |
| WO | WO-9618677 A1 * | 6/1996 | ............. C08F 10/02 |
| WO | 2017133918 A1 | 8/2017 | |

OTHER PUBLICATIONS

Alt et al., "Bimodal Polyethylene—Interplay of Catalyst and Process," Macromol. Symp. 2001, 163, 135-143.
Colin et al., "Aging of Polyethylene Pipes Transporting Drinking Water Disinfected by Chlorine Dioxide. I. Chemical Aspects", Polymer Engineering and Science (2009) 1429-1437.
International Search Report for International Application No. PCT/EP2016/072928; International Filing Date: Sep. 27, 2016; dated Nov. 18, 2016; 6 Pages.
PE 100 Pipe Systems, second edition, Heiner Bromstrup (editor), 2004, pp. 16-20 ISBN 3-8027-2728-2.
Written Opinion of the International Searching Authority for International Application No. PCT/EP2016/072928; International Filing Date: Sep. 27, 2016; dated Nov. 18, 2016; 6 Pages.

* cited by examiner

*Primary Examiner* — Angela C Scott
(74) *Attorney, Agent, or Firm* — Cantor Colburn LLP

(57) ABSTRACT

The invention relates a pipe for the transport of water with improved resistance to chlorinated disinfectants. The pipe is produced with a polymer composition comprising a polyolefin and styrene isoprene blockcopolymer.

18 Claims, No Drawings

PIPE PRODUCED WITH A POLYMER COMPOSITION COMPRISING A POLYOLEFIN

CROSS REFERENCE TO RELATED APPLICATIONS

This application is a 371 of International Application No. PCT/EP2016/072928, filed Sep. 27, 2016, which claims priority to European Application No. 15187971.5 filed Oct. 1, 2015 which are incorporated herein by reference in their entirety.

The present invention relates to a pipe for the transport of water produced with a polymer composition comprising a polyolefin. The pipe has an improved resistance to chlorinated disinfectants.

Pipes for the transport of gas, for sanitation and for water supply may be produced with for example bimodal polyethylene compositions. Pipes have a very good resistance to water however their lifetime is shortened when the pipes come into contact with disinfectants which are often added to water for hygienic reasons. The chlorine dioxide used as disinfectant in water degrades most materials including polyethylene (Colin, Aging of polyethylene pipes transporting drinking water disinfected by chlorine dioxide, part I, Chemical aspects; Polymer engineering and Science 49(7); 1429-1437; July 2009). Other chlorinated solvents are for example chloramine and chlorine. It is known in the art to apply additives for example antioxidants and stabilizers to prevent said degradation. Several types of additives are proposed to protect polymers during processing and to achieve the desired end-use properties. However, appropriate combinations of stabilizers have to be carefully selected, depending on the desired final properties the polymeric article should have.

It is the object of the present invention to provide pipe applications with improved service lifetime for the transportation of water containing chlorinated disinfectants, for example chlorine dioxide, chloramine and chlorine.

The pipe for the transport of water according to the invention is produced with a polymer composition comprising a polyolefin and styrene isoprene blockcopolymer wherein the amount of styrene isoprene blockcopolymer in the composition is lower than 2.0 wt % relative to the total weight amount of the composition.

Suitable styrene isoprene blockcopolymers include for example styrene-isoprene diblock copolymers, styrene-isoprene-styrene triblock copolymers and mixtures.

The styrene isoprene blockcopolymer is a non-hydrogenated styrene isoprene blockcopolymer.

The drinking water pipe, preferably a pressure pipe, based on this polyolefin grade has an improved protection against for example chlorine dioxide containing cold or hot water and consequently a longer life time. It is also possible to transport waste water or water for cooling.

The polyolefin may be selected from polyethylene such as a multimodal polyethylene for example a bimodal or trimodal polyethylene or polypropylene.

Preferably, the polyolefin is multimodal polyethylene.

More preferably, the polyolefin is bimodal polyethylene.

According to a further preferred embodiment of the invention the pipe is produced with a composition comprising
(a) polyolefin
(b) styrene isoprene blockcopolymer
(c) polyphenolic compound and/or
(d) organic phosphite and/or phosphonite.

Preferably the weight ratio (b):(c+d) ranges between 7:1 and 1:7.

Suitable polyphenolic compounds include for example tetrakis[methylene-3-(3',5'-di-t-butyl-4-hydroxyphenyl)propionate] methane; 1,1,3-tris(2-methyl-4-hydroxy-5-t-butylphenyl)butane; 1,3,5-trimethyl-2,4,6-tris(3,5-di-t-butyl-4-hydroxybenzyl)benzene, bis(3,3-bis(4'-hydroxy-3'-t-butylphenyl)butanoic acid]-glycol ester; tris(3,5-di-t-butyl-4-hydroxy benzyl)isocyanurate; 1,3,5-tris(4-t-butyl-2,6-dimethyl-3-hydroxy-benzyl)isocyanurate; 5-di-t-butyl-4-hydroxy-hydrocinnamic acid triester with 1,3,5-tris(2-hydroxyethyl)-s-triazine-2,4,6(1H, 3H, 5H)-trione; p-cresol/dicyclopentadiene butylated reaction product; 2,6-bis(2'-bis-hydroxy-3'-t-butyl-5'-methyl-phenyl-4-methyl-phenol).

A preferred polyphenolic compound is 1,3,5-trimethyl-2,4,6-tris(3,5-di-t-butyl-4-hydroxybenzyl)benzene (Irganox 1330 supplied by BASF).

Suitable organic phosphites and phosphonites include for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphate, bis(2,6-di-tert-butyl-4-methylphenyl) pentaerythritol diphosphate, bisisodecyloxy-pentaerythritol diphosphite, bis(2,4-di-tert-butyl-6-methylphenyl) pentaerythritol diphosphite, bis(2,4,6-tri-tert-butylphenyl) pentaerythritol diphosphite, tristearyl sorbitol triphosphite, tetrakis(2,4-di-tert-butylphenyl) 4,4'-biphenylenediphosphonite, 6-isooctyloxy-2,4,8,10-tetra-tert-butyl-12H-dibenzo[d,g]-1,3,2-dioxaphosphocin, 6-fluoro-2,4,8,10-tetra-tert-butyl-12-methyldibenzo[d,g]-1,3,2-dioxaphosphocin, bis(2,4-di-tert-butyl-6-methylphenyl) methyl phosphite, bis(2,4-di-tert-butyl-6-methylphenyl) ethyl phosphite.

A preferred phosphite is tris(2,4-di-tert-butylphenyl) phosphite (Irgafos 168 supplied by BASF).

According to another preferred embodiment of the invention the pipe is produced with a polyethylene composition comprising
(a) multimodal polyethylene
(b) styrene isoprene blockcopolymer
(c) polyphenolic compound and
(d) organic phosphite and/or phosphonate wherein the weight ratio (b):(c+d) ranges between 7:1 and 1:7.

Preferably (b, (c) and (d) are added during the granulation step of the multimodal, for example bimodal, high density polyethylene powder.

According to a preferred embodiment of the invention the components are added to the polyethylene resin while the polyethylene is in a molten state during extrusion.

The components may be added together and may be added separately.

Preferably the components are added in one step.

Preferably the amount of polyolefin in the composition is higher than 95.0 wt %.

Preferably the amount of styrene isoprene blockcopolymer in the composition is lower than 1.0 wt %.

More preferably this amount ranges between 0.05 and 0.9 wt %. These amounts protect the pipe against chlorine dioxide during a long period.

The multimodal ethylene polymer may be an ethylene homo- or copolymer.

The multimodal ethylene grades to be applied in pipe applications may comprise additives such as for example carbon black, pigments, stearates, a UV stabilizer for example a sterically hindered amine, fillers, minerals, lubricants and/or other stabilisers.

The production processes for bimodal high density polyethylene (HDPE) are summarised at pages 16-20 of "PE 100 Pipe systems" (edited by Bromstrup; second edition, ISBN 3-8027-2728-2).

The production of bimodal high density polyethylene (HDPE) via a low pressure slurry process is described by Alt et al. in "Bimodal polyethylene-Interplay of catalyst and process" (Macromol. Symp. 2001, 163, 135-143). Bimodal high density polyethylene may be produced via a low pressure slurry process for the production of comprising a polymerisation stage, a powder drying stage, an extrusion and pellet handling stage, a recycling stage and a wax removal unit. In a two stage cascade process the reactors may be fed continuously with a mixture of monomers, hydrogen, catalyst/co-catalyst and diluent recycled from the process. In the reactors, polymerisation of ethylene occurs as an exothermic reaction at pressures in the range between for example 0.5 MPa (5 bar) and 1 MPa (10 bar) and at temperatures in the range between for example 75° C. and 88° C. The heat from the polymerisation reaction is removed by means of cooling water. The characteristics of the polyethylene are determined amongst others by the catalyst system and by the concentrations of catalyst, co monomer and hydrogen. The production of bimodal high density polyethylene (HDPE) via a low pressure slurry process may also be performed via a three stage process.

The concept of the two stage cascade process is elucidated at pages 137-138 by Alt et al. "Bimodal polyethylene-Interplay of catalyst and process" (Macromol. Symp. 2001, 163). The reactors are set up in cascade with different conditions in each reactor including low hydrogen content in the second reactor. This allows for the production of HDPE with a bimodal molecular mass distribution and defined co monomer content in the polyethylene chains.

Suitable catalysts for the production of multimodal polyethylene include Ziegler Natta catalysts, chromium based catalysts and single site metallocene catalysts. In all potential possible technologies the process and the catalyst have to form a well-balanced system. The catalyst is crucial for the polymerisation reaction of multimodal polyethylene. By cooperation of process and catalyst a definite polymer structure is produced.

EP2484723 discloses a thermoplastic elastomer composition comprising: 100 parts by mass of (a) a hydrogenated block copolymer that is a hydrogenated product of a block copolymer containing (A) a polymer block containing a structural unit derived from an aromatic vinyl compound and (B) a polymer block containing a structural unit derived from isoprene or a mixture of isoprene and butadiene, having a total content of a 3,4-bond unit and a 1,2-bond unit of 45% or more, has a peak top molecular weight (Mp) obtained by gel permeation chromatograph in terms of polystyrene standard of from 250,000 to 500,000, and is in a form of powder having a bulk density of from 0.10 to 0.40 g/mL; from 10 to 300 parts by mass of (b) a softening agent; and from 5 to 200 parts by mass of (c) a polyolefin resin. The styrene thermoplastic elastomer composition is excellent in flexibility, molding processability, visual transparency, damping property, retention of a softening agent and compression set at a high temperature. EP2484723 provides a sealing material for medical use that contains the styrene thermoplastic elastomer composition, and is excellent in oxygen gas barrier property, liquid leakage resistance (sealing property), coring resistance and liquid leakage resistance after needle stick.

U.S. Pat. No. 3,299,174 discloses a polymer composition comprising a hydrogenated block copolymer having the general configuration prior to hydrogenation polystyrene-polyisoprene-polystyrene.

US20120070597 is directed to a composition to be applied in the production of flexible medical tubing to be used in the human body during medical treatments. The composition comprises a mixture of a polyolefin and a styrenic based block copolymer.

EP2484723, US32999174 and US20120070597 do not disclose pipes for the transport of water having an improved resistance to chlorinated disinfectants.

EP2454076 discloses a pipe for transport of water comprising a layer comprising a crosslinked polyethylene.

The invention will be elucidated by means of the following non-limiting examples.

EXAMPLES

SABIC Vestolen A5924 (Resin A) used as base polymer in all examples was a bimodal high density polyethylene with $MFR_5$ of 0.24 g/10 min and density 958 kg/m³.

Examples I-II and Comparative Examples A-C

The Examples I-II and Comparative Examples A-C use different additive packages in combination with Resin A to protect the polyethylene from attack by chlorine dioxide (see Table 1). The components as indicated in Table 1 were mixed at 245 degrees Celcius using a twin screw extruder.

TABLE 1

| Composition | Resin A wt % | Calcium stearate ppm | Carbon black wt % | Irganox 1010 ppm | Irgafos 168 ppm | styrene isoprene blockcopolymer ppm | Irganox 1330 ppm | DHT4A ppm |
|---|---|---|---|---|---|---|---|---|
| A | 97 | 2000 | 2.5 | 2000 | 1000 | 0 | 0 | 0 |
| B | 96.15 | 2000 | 2.5 | 2000 | 2500 | 0 | 5000 | 2000 |
| C | 96.44 | 2000 | 2.5 | 2000 | 2000 | 0 | 3200 | 1400 |
| I | 96 | 2000 | 2.5 | 2000 | 2500 | 5000 | 5000 | 2000 |
| II | 96.34 | 2000 | 2.5 | 2000 | 2000 | 3200 | 3200 | 1400 | wherein:

Irganox 1010:Tetrakis [methylen-3-(3',5')-di-t-butyl-4'-hydroxyphenyl) propionate] methane commercially available from Ciba Speciality Chemicals, Styrene-isoprene-styrene block copolymer: Kraton D1113PT obtained from Kraton Polymers U.S. LLC;

Irganox 1330: 1,3,5-Trimethyl-2,4,6-tris(3,5-di-tert-butyl-4-hydroxybenzyl)benzene;

Irgafos 168: Tris(2,4-di-tert-butylphenyl) phosphite;

DHT-4A®, commercially available hydrotalcite from Kisuma Chemicals.

Resin A: SABIC Vestolen A5924; bimodal high density polyethylene with MFR$_5$ 0.24 g/10 min and density 958 kg/m$^3$.

Compounds were compression molded using ISO1872-2 resulting in plaques, which were cut to ISO527-1A tensile bars (4 mm thick).

Ageing Test

The tensile bars were aged in a continuous water flow at a temperature of 40° C. with a chlorine dioxide concentration maintained at 1 mg/L and a pH maintained at 7.2. Flow rate was regulated at 200 L/h. Water hardness was regulated to 20° F. A constant fresh water flow was added during testing allowing full renewal of the testing water each 4 hrs. The compression molded samples were aged for 1000 hrs.

Tensile tests according to Plastics-Determination of tensile properties ISO527-1 at room temperature at a strain rate of 50 mm/min on aged and non-aged tensile bars were performed to determine the residual elongation at break for the aged samples and reported in Table 2.

TABLE 2

| Composition | Elongation @ break before ageing in % | Elongation @ break after ageing in % |
|---|---|---|
| A | 466 | 33 |
| B | 301 | 259 |
| C | 463 | 32 |
| I | 469 | 390 |
| II | 457 | 366 |

From Table 2 it can be concluded that Examples I and II demonstrate significantly higher elongation at break after being exposed to water containing chlorine dioxide than Comparative Example A.

Comparing

Comparative Example B to Example I and

Comparative Example C to Example II shows that the effect of adding styrene isoprene blockcopolymer had an additional profound effect on the elongation at break as obtained after exposure to water containing chlorine dioxide.

The invention claimed is:

1. A pipe for the transport of water produced with a polymer composition comprising: a polyolefin and styrene isoprene block copolymer wherein the amount of styrene isoprene block copolymer in the composition is greater than zero to lower than 2.0 wt% relative to the total weight amount of the composition, wherein the styrene isoprene block copolymer consists of styrene blocks and isoprene blocks.

2. The pipe according to claim 1 characterised in that the polyolefin is polyethylene or polypropylene.

3. The pipe according to claim 1, characterised in that the styrene isoprene block copolymer is styrene-isoprene diblock copolymers, styrene- isoprene-styrene triblock copolymers and mixtures.

4. The pipe according to claim 1, characterised in that the styrene isoprene block copolymer is a non- hydrogenated styrene isoprene block copolymer.

5. The pipe according to claim 1, characterised in that the composition comprises a polyphenolic compound and/or an organic phosphite and/or phosphonite.

6. The pipe according to claim 5, characterised in that the composition comprises a polyphenolic compound which is 1,3,5-trimethyl-2,4,6-tris(3,5-di-t-butyl-4-hydroxybenzyl)benzene.

7. The pipe according to claim 5, characterised in that the composition comprises a phosphite which is tris(2,4-di-tert-butylphenyl) phosphite.

8. The pipe according to claim 1, characterised in that the polyolefin is multimodal polyethylene.

9. The pipe according to claim 8, characterised in that the polyolefin is bimodal polyethylene.

10. The pipe according to claim 1, characterised in that the amount of styrene isoprene block copolymer in the composition is greater than zero to lower than 1.0 wt%.

11. The pipe according to claim 1, produced with a composition comprising (a) polyolefin;
   (b) styrene isoprene block copolymer;
   (c) polyphenolic compound; and/or
   (d) organic phosphite and/or phosphonate wherein the weight ratio (b): (c+d) ranges between 7:1 and 1:7.

12. The pipe according to claim 1, wherein the amount of styrene isoprene block copolymer in the composition is between 0.05 and 0.9 wt% relative to the total weight amount of the composition.

13. A pipe for the transport of water produced with a polymer composition comprising:
   (a) multimodal polyethylene;
   (b) styrene isoprene block copolymer consisting of styrene blocks and isoprene blocks;
   (c) polyphenolic compound comprising 1,3,5-trimethyl-2,4,6-tris(3,5-di-t-butyl-4-hydroxybenzyl)benzene; and/or
   (d) organic phosphite and/or phosphonate wherein the weight ratio (b):(c+d) ranges between 7:1 and 1:7;
   wherein the amount of styrene isoprene block copolymer in the composition is greater than zero to lower than 2.0 wt% relative to the total weight amount of the composition.

14. The pipe according to claim 12, wherein the amount of styrene isoprene block copolymer in the composition is between 0.05 and 0.9 wt% relative to the total weight amount of the composition.

15. A pipe for the transport of water produced with a polymer composition comprising, based on the total weight of the composition:
   (a) greater than 95 wt% of a multimodal polyethylene;
   (b) 0.05 to 0.9 wt% of a styrene isoprene block copolymer which is a non-hydrogenated styrene-isoprene-styrene triblock copolymer consisting of styrene blocks and isoprene blocks;
   (c) a polyphenolic compound comprising 1,3,5-trimethyl-2,4,6-tris(3,5-di-t-butyl-4-hydroxybenzyl)benzene; and
   (d) an organic phosphite and/or a phosphonate wherein the weight ratio (b):(c+d) ranges between 7:1 and 1:7.

16. The pipe of claim 15, wherein the polymer composition comprises the organic phosphite, which is tris(2,4-di-tert-butylphenyl) phosphite.

17. The pipe of claim 16, wherein the polymer composition further comprises calcium stearate.

18. The pipe of claim 17, wherein the multimodal polyethylene is a bimodal high density polyethylene with MFR$_5$ of 0.24 g/10 min and density of 958 kg/m$^3$.

* * * * *